Sept. 11, 1962 — M. J. DE MILLEVILLE — 3,053,463
FUEL INJECTION NOZZLE
Filed Jan. 3, 1961 — 2 Sheets-Sheet 1

INVENTOR
Maurice Joseph de Milleville
BY Connolly and Hutz
ATTORNEYS

United States Patent Office 3,053,463
Patented Sept. 11, 1962

3,053,463
FUEL INJECTION NOZZLE
Maurice Joseph de Milleville, 14 Rue des Maronniers, Paris, France
Filed Jan. 3, 1961, Ser. No. 80,120
Claims priority, application France Dec. 31, 1959
6 Claims. (Cl. 239—584)

This invention relates to a process for injecting a fluid or gaseous substance under pressure into a medium which is under pressure or partial vacuum, in particular for injecting fuel in cylinder spaces of combustion engines, as well as a device for performing the process.

The present invention provides an injection device with interior equilibrium also intended for performing the prior art process. Due to several causes injection devices with conic nozzles unavoidably are subject to interior pressure fluctuations. These make it very difficult and mostly even imposible to attain a sufficient accuracy of the injection process under aggravated conditions, especially with higher speeds. Furthermore, injection devices for injecting small amounts, which are hydraulically controlled, are dependent on the relation between the highest pressures for opening and lowest pressures for closing. This is the reason, why very small amounts of injected substances cannot be controlled, although they become very needed for motors with small cylinder capacities, where the Diesel motor would have a quite important, new field.

The object of this invention is to create an injection device without the deficiencies of already known devices, and characterized by being in the state of an indifferent equilibrium during its operation.

According to the invention the problem is solved by a construction as seen in the accompanying drawings in which.

Figure 1:
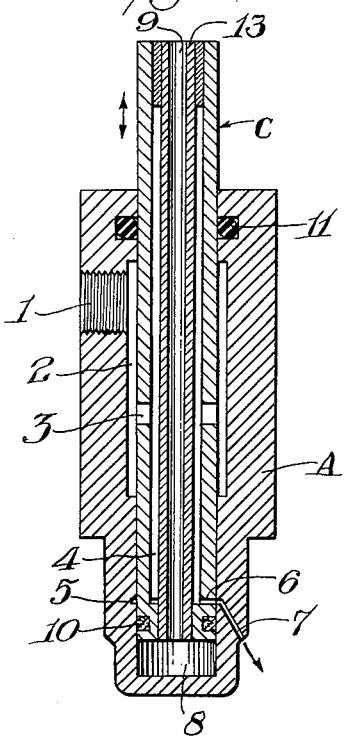
FIGURE 1 is a vertical section through one form of my improved device.
Figure 3:
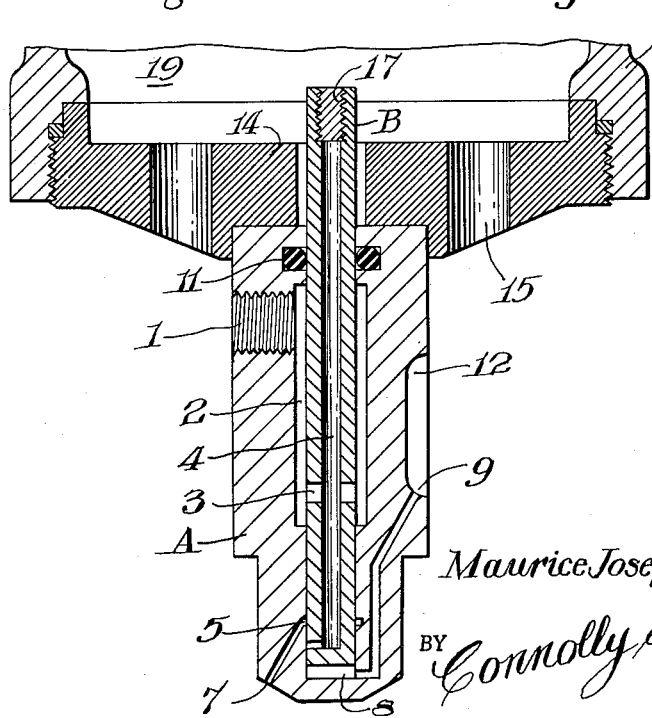
FIGURE 3 is an enlarged vertical section taken on the line 3—3 of FIGURE 2.

In both cases the actual injection device consists of a stationary, mainly cylindrical part A which is hollowed through a large extent of its length. A piston-like element C, FIGURE 1, or B, FIGURE 3, is arranged in the hollow space of part A and is movable in axial direction. The piston-like element C, or B, is hollowed, too, at least to a large extent of its length. This is hollow space 4. The fluid to be injected is fed by a pump, not represented, through the bore hole 1 and the ring space 2—both of part A—to the injection device, and enters through the holes 3 in the piston C or B and into the hollow interior of the oscillating piston. In the lower part of the hollow space 4 of the piston one or more holes 6 are provided, which are closed by the inner wall of the bore of part A as long as the piston C, or B is in lower position. The injection device is not operating in the position shown in FIGURE 3. If the piston C or B is in the upper position—as seen in FIGURE 1—the holes 6 in the piston walls are facing a circular channel 5 in the bore of part A, from where the injection channels 7 are leaving. The injection takes place in this upper position of the piston C or B.

The piston C in the embodiment of FIGURE 1 is a cylindrical pipe 13 being open on both ends by a bore 9, through which an increase of air-pressure, created by the downwards motion of the piston in space 8, is immediately compensated upwards against the open air. This is done to prevent a detrimental increase of pressure of the air volume in space 8, when the piston C or B moves from the top to the bottom. In the embodiment of FIGURE 3 the same effect is achieved by channel 9 in part A. Channel 9 ends in a notch 12 which is in contact with the open air. Thus no increase of the air pressure in space 8 affects the oscillating motion of the piston C or B.

The construction according to the invention has the advantage that with any pressure of the injected fluid within the injection device the motions of the piston cause no counter-pressure of injected fluid or air. By moving the piston by hand, one observes that it can be stopped in any position whatsoever, without an inner force trying to move it from this position. The piston is in fact in a stae of indifferent equilibrium.

Figure 4:
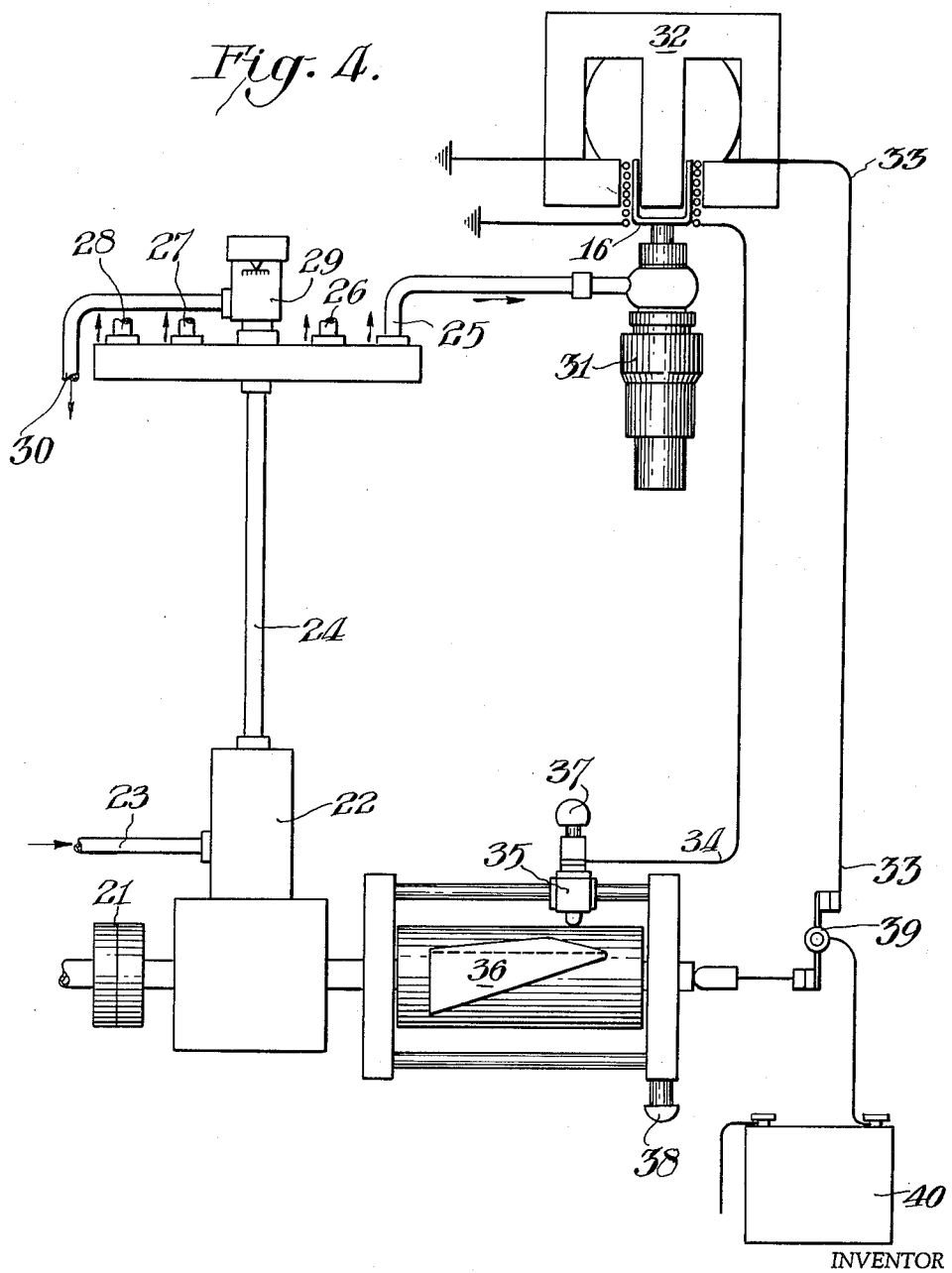
FIGURE 4 is a general diagrammatic arrangement of a fuel injection system comprising my invention.

In the practice, some force not shown in the drawings and acting without actual inertia returns the piston C or B always in that position, where no injection takes place, while a mobile armature 16 of an electro magnet 32, as shown in FIGURE 4, pulls the piston into injecting position, if and as long as the circuit of the magnet is under electric tension. The arrangement of parts in which the mobile armature 16 is attached to the respective pistons C and B is generally illustrated by the showing of the injection device 31 in FIGURE 4.

In both embodiments of FIGURES 1 and 3 a so-called O-ring 11 is shown made of a special rubber substance resistant to high temperatures. Part 10 in FIGURE 1 shows an inserted segment at the level bottom of the piston C intended for better insulation. These two parts represent no special characteristics of the invention.

FIGURE 4 shows how the injection device indicated above is connected with the mobile armature of the electro magnet.

Small amounts of injection fluid can escape, if after a long operating period a certain leakage develops between the piston C resp. C and part A. A suitable means not illustrated in the figures can be provided for conserving the fluid of this leakage. For example, flat ring space can be provided above part A in the piston holder for draining said small amounts. A channel leads from the ring space outwards to a collecting vessel from where the escaped fluid is returned to the tank through a return pipe.

The piston C, or B of the injection device can be connected with the armature of the electro magnet by simple mechanical means, not shown in the figures, which are provided at the end of the piston, at the inner pipe C, or in the interior of the magnet itself. As shown in FIGURE 3 the piston B is provided with internal threads 17. The mobile armature 16, not shown in FIGURE 3, can be easily mounted at the upper end of B by means of these threads 17.

It may become necessary for better access or because of other reasons to arrange the magnet in a position removed from the injection device. Various mechanical means, not illustrated in the figures may be provided whereby these two elements can be connected. For example, a cam shaft as it is used with a valve gear may be used. Such a control device may be necessary, too, if the injection should be performed in two phases. In the first phase of such two phase injection only a small portion of the total injecting amount is fed into the cylinder, in order to induce the ignition before the remaining injection fluid arrives at the cylinder. For this purpose a circular channel 5, shown in FIGURES 1 and 3, is provided in part A in suitable distance. Thereby the travel of the piston becomes much longer. It is therefore necessary to interpose between the magnet and the injection device a tilting lever not shown. This is not difficult with regard to the construction, because the resistance of the motion of the injection device is very small.

FIGURE 4 shows the arrangement of the injection device according to the invention in connection with the device specified in the main claim.

Figure 2:
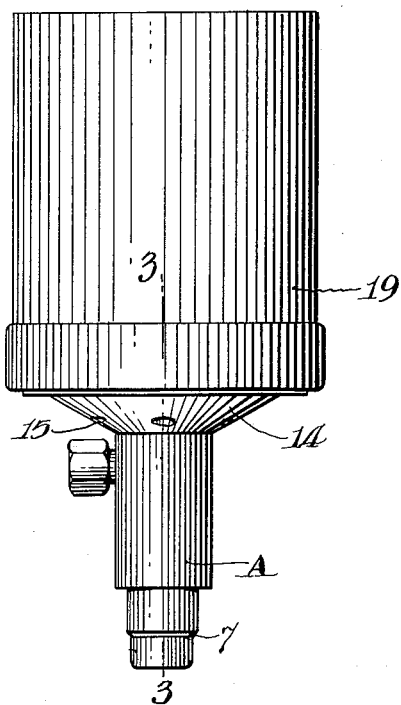
FIGURE 2 is a side elevation of another form of my device.

The injecting device 31 of the invention according to FIGURES 1 to 3 is directly controlled by the mobile armature of the electro magnet 32. The main winding of this magnet is fed from the battery 40 via the breaker 39 and the line 33. The armature winding receives the current via the relay and breaker 39, the conductive area 36 arranged on a rotating cylinder, the collector 35 touching said area, and the line 34. An adjusting screw 37 coupled with the control device or operated by hand is used for adjusting the collector 35. The timing of the injection can be advanced or delayed by means of an adjusting screw 38. The rotating cylinder is driven via the coupling 21 by a shaft of the motor. The fluid pump 22 is fed with liquid fuel through the pipeline 23 from the tank, and brings the fuel through the pipeline 24 simultaneously to the inlets 25, 26, 27, 28 to the corresponding four injection devices. Only one of these injection devices 31, is shown to provide a clearer representation. A valve for general pressure regulation is also provided which can be adjusted according to a graded scale. The pressure excess is carried away to the fuel tank through the pipeline 30. The cylinder fed by the injection device, the spark plug, and the device for creating a spark in the spark plug, when the injection is completed, resp. the device for heating the glo-head ignitor are not shown in the figure, with the purpose of simplification.

According to the embodiment as specified it is assumed that the armature controlling the magnet piston of the injection device is fed with current of the same tension as the main winding. This type of electro magnet permits it, too, to insert a transformer, not illustrated in FIGURE 4, between the relay and breaker 39 and the rotating distributor, so that a current with higher tension is supplied for operating the magnet piston. Thereby the cross section of the collector 35 can be reduced. The periods, in which the collector 35 exceeds just the upper or lower edge of the conductive area and thereby contacts it not with its entire cross section, become actually minimum. Therefore they can be disregarded.

The valve 29 for regulating the pressure enables the driver to adjust the injection pressure equally for all cylinders by a simple manipulation while driving the cars; and that according to the momentary requirements of the motor. In this way adjustments can be made while driving in different altitudes or with different fuel qualities. Moreover, the fuel consumption can be adjusted always to the power required by the motor. This was not possible with the hitherto-existing injection devices.

The injection device according to the invention distinguishes itself by an excellent precision in operation under either easiest or toughest conditions, because the variations within the device cause under no conditions any counterpressure of fluids or gases, but guaranty a state of constant, indifferent equilibrium. The injection takes place with a constant and total pressure from beginning to the end of each particular performance which sets in and ends at that very moment, so that there are no indistinct transition periods. Due to this fact the channels for fuel supply can be constructed with smaller widths with the result of a stronger jet and more extensive injection, which promotes the ignition. Therefore it is also possible that the injection device expels not one single thick jet, but several thin jets which reach the hollow space being under pressure at different points, and consequently reduce the retardation of ignition. The device according to the invention makes it also possible to inject extremely small fuel amounts at low speed as well as at high speed. The injected amount is exclusively dependent on the moment in which the piston is in that position which permits the fuel to pass. This timing is determined by the shape of the conductive area 36 of the rotating cylinder of the distributor.

The possibility of separating the injection process in two phases was already mentioned above. For this purpose a second circular channel is provided in the injection device for feeding the injection channels 7. The injection piston is extended correspondingly. Each of the partial injections is thereby also calculated exactly and uniformly as to the injected amount.

The injection device is completely unaffected by the pressure within the motor cylinder.

What is claimed is:

1. A device for injecting fluid into combustion engines composed of a cylindrical injection body, an axial chamber in said cylindrical body closed at one end, a cylindrical element having an elongated fluid transfer passage therein and mounted in said chamber within said body and oscillatable in an axial direction, a first passage through the wall of the body in communication with the supply of injection fluid, a second passage in the cylindrical element communicating with the first passage and receiving injection fluid therefrom through said chamber, said elongated passage providing access of said second passage to a first port, a second port in the wall of the cylindrical element alignable with the first port by reciprocation of said cylindrical element for feeding fluid from the device into a combustion engine, a variable volume chamber formed in the end of the body by the end of the cylindrical element and the chamber walls, and a third passage providing access from said variable volume chamber to the exterior of the device, so constructed and arranged that said fluid is transported within the cylindrical element and is injected into the combustion engine by intermittent injection under a constant and even fuel pressure.

2. An injection device as claimed in claim 1 in which said third passage is a central bore connecting said variable volume chamber with the open air at the exterior of the device.

3. An injection device as claimed in claim 1 in which said third passage is a channel in the cylindrical body connecting the variable volume chamber to the open air in the exterior of the device.

4. An injection device as claimed in claim 1 in which a circular channel is connected with said elongated passage within said cylindrical element, said first port proceeding from said passage.

5. An injection device as claimed in claim 4 having plurality of ports proceeding from said circular channel.

6. An injection device as claimed in claim 1, said second port having a small diameter.

References Cited in the file of this patent

UNITED STATES PATENTS

| 1,050,779 | Miller | Jan. 14, 1912 |
| 1,627,727 | Charter | May 10, 1927 |
| 1,734,802 | French | Nov. 5, 1929 |
| 1,792,929 | Remey | Feb. 17, 1931 |
| 2,317,618 | King | Apr. 27, 1943 |
| 2,959,360 | Nichols | Nov. 8, 1960 |

FOREIGN PATENTS

| 733,264 | Germany | Mar. 23, 1943 |